(12) United States Patent
Carrie et al.

(10) Patent No.: US 7,650,539 B2
(45) Date of Patent: Jan. 19, 2010

(54) OBSERVING DEBUG COUNTER VALUES DURING SYSTEM OPERATION

(75) Inventors: Susan E. Carrie, Mountain View, CA (US); Jeffrey A. Andrews, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 11/170,818

(22) Filed: Jun. 30, 2005

(65) Prior Publication Data

US 2007/0006040 A1 Jan. 4, 2007

(51) Int. Cl.
*G06F 11/00* (2006.01)
(52) U.S. Cl. .......................................... 714/47
(58) Field of Classification Search .................... 714/47
See application file for complete search history.

(56) References Cited

U.S. PATENT DOCUMENTS

| | | | | |
|---|---|---|---|---|
| 5,537,541 | A * | 7/1996 | Wibecan | 714/45 |
| 5,615,135 | A * | 3/1997 | Waclawsky et al. | 702/182 |
| 5,875,294 | A * | 2/1999 | Roth et al. | 714/39 |
| 6,134,676 | A | 10/2000 | VanHuben et al. | |
| 6,145,103 | A * | 11/2000 | Typaldos et al. | 714/55 |
| 6,154,857 | A * | 11/2000 | Mann | 714/30 |
| 6,542,844 | B1 | 4/2003 | Hanna | |
| 6,701,447 | B1 * | 3/2004 | Bass et al. | 713/502 |
| 7,249,288 | B2 * | 7/2007 | Peled et al. | 714/47 |
| 2002/0131190 | A1 | 9/2002 | Groo | |
| 2003/0074650 | A1 | 4/2003 | Akgul et al. | |
| 2003/0110430 | A1 | 6/2003 | Bailis et al. | |
| 2003/0140285 | A1 | 7/2003 | Wilkie | |
| 2004/0019831 | A1 | 1/2004 | Gergen et al. | |
| 2004/0193790 | A1 | 9/2004 | Johnson | |
| 2004/0199388 | A1 * | 10/2004 | Armbruster et al. | 704/251 |
| 2004/0237003 | A1 * | 11/2004 | Adkisson | 714/47 |

FOREIGN PATENT DOCUMENTS

EP 1 091 298 6/2004

OTHER PUBLICATIONS

"Excalibur Debugging Solutions," www.altera.com/products/devices/arm/system/exc-debug.html.
Curnow, et al., "An Embedded Processor Architecture With Extensive Support for SoC Debug," www.us.design-reuse.com/articles/article5505.html.
Zilmer, et al., "Non-Intrusive On-chip Debug Hardware Accelerates Development for MIPS RISC Processors," www.mips.com/content/PressRoom/TechLibrary/WhitePapers/ejtag.

* cited by examiner

*Primary Examiner*—Robert Beausoliel
*Assistant Examiner*—Amine Riad
(74) *Attorney, Agent, or Firm*—Vierra Magen Marcus & DeNiro LLP

(57) ABSTRACT

A debugging architecture includes a set of debug counters for counting one or more events based on a set of signals from a device being monitored. The architecture provides for observing the outputs of the debug counters during operation of the device. The outputs of the counters are provided to an output bus (e.g., a Debug Bus) via an output bus interface during operation of the device being monitored. A data gathering system can access the output bus in order to gather the data from the counters for analysis.

12 Claims, 14 Drawing Sheets

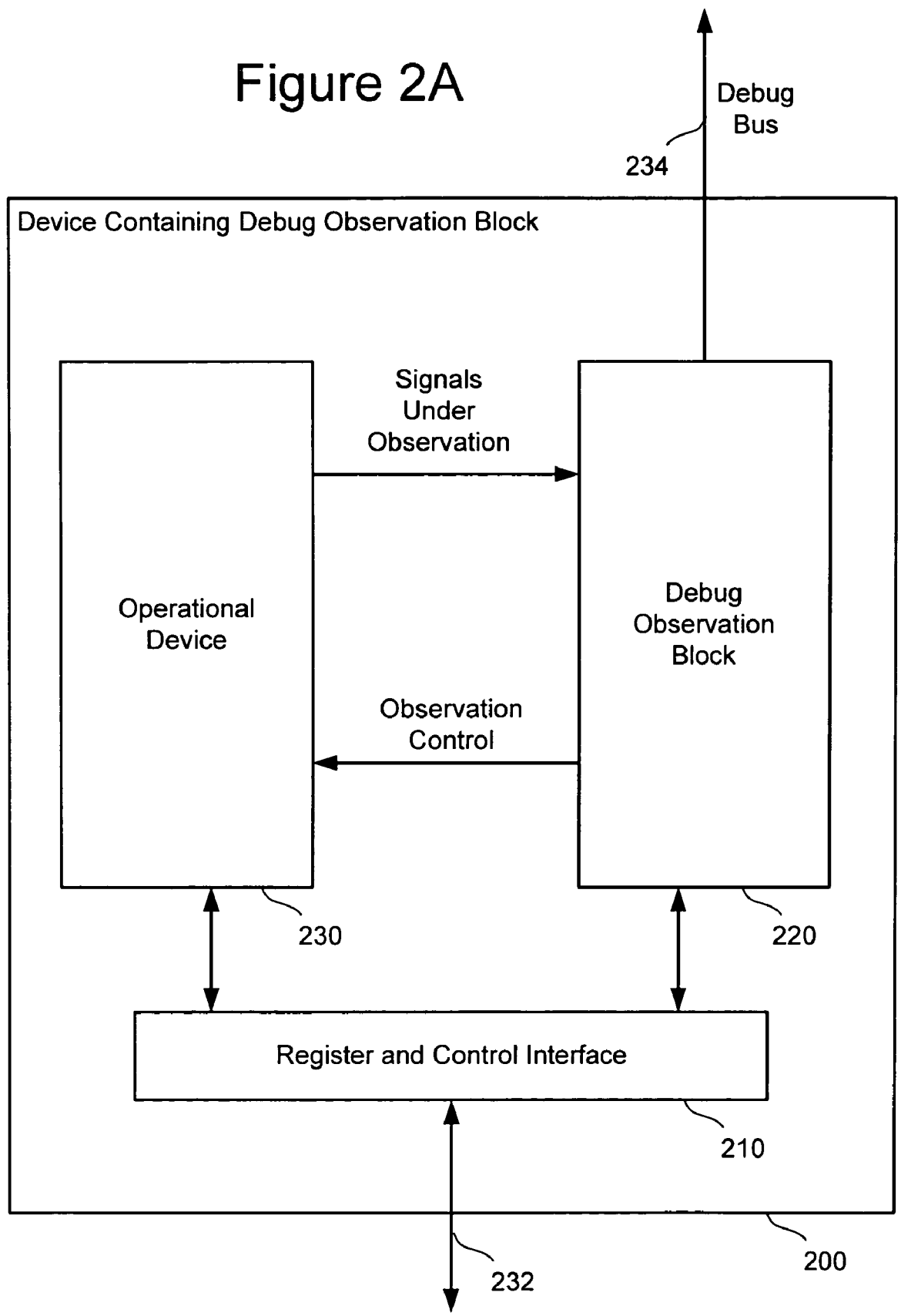

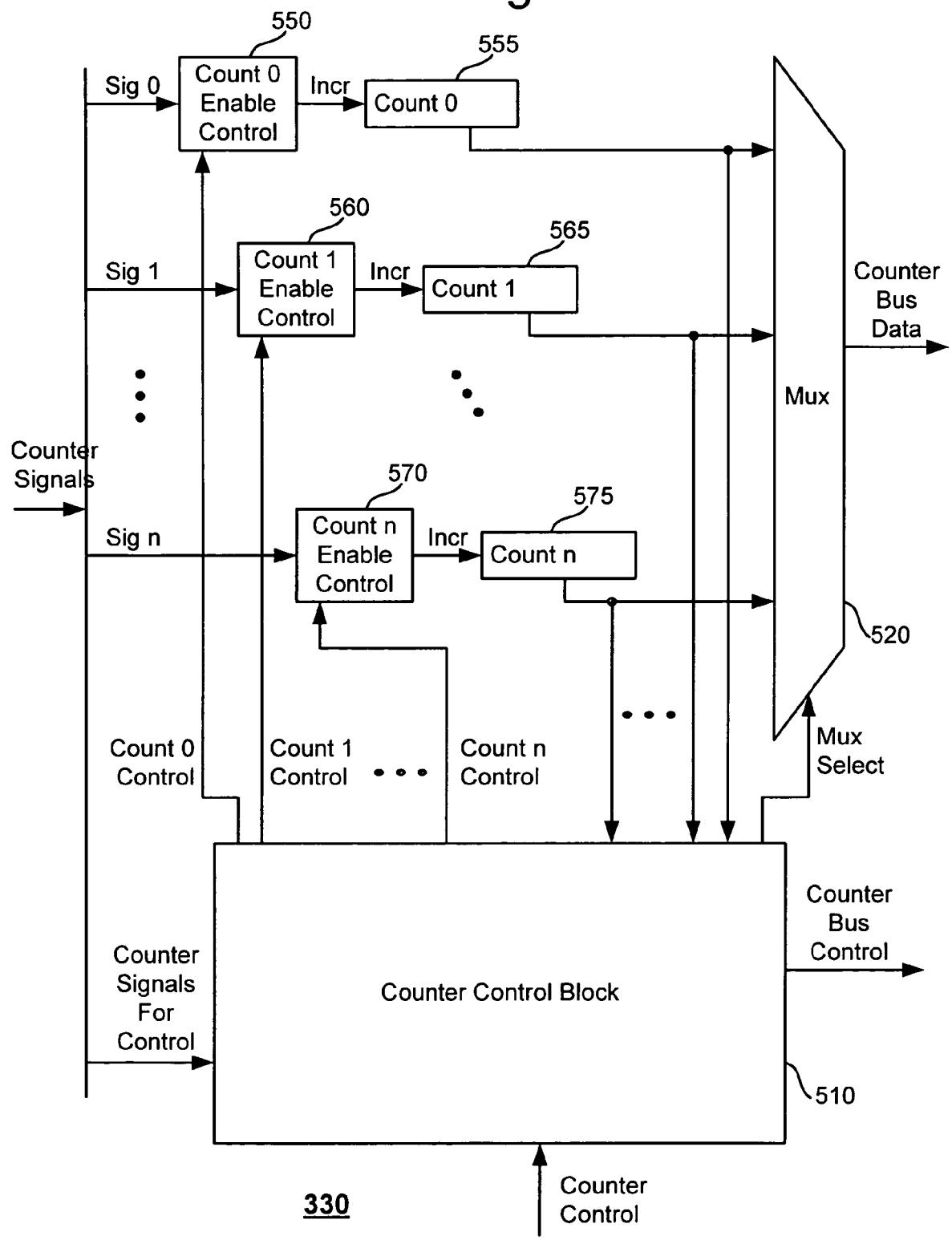

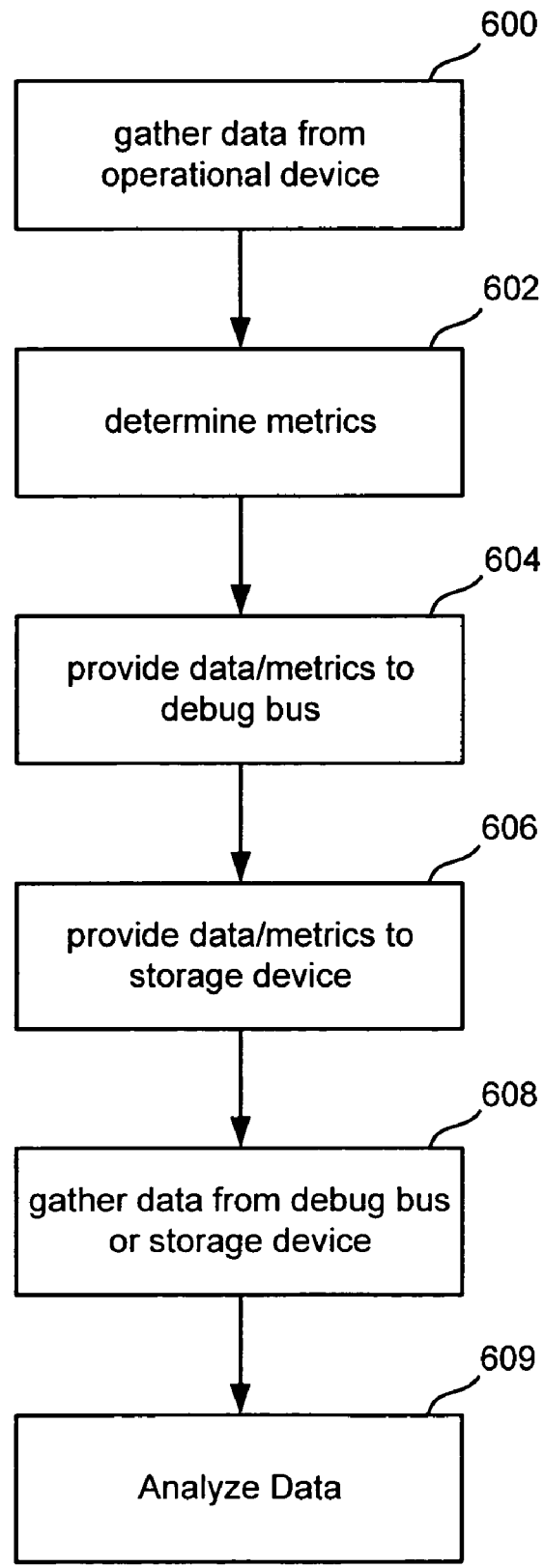

OBSERVING DEBUG COUNTER VALUES DURING SYSTEM OPERATION

BACKGROUND

In order to perform debugging, many devices (e.g., computing systems) include a set of counters that track the number of times an event occurs (e.g., writes to RAM). Typically, the outputs of the counters are available via an interface, such as a CPU interface, that allows the values in the counters to be read like registers. Such an arrangement has several drawbacks. For example, the CPU generally must stop its operation to read the registers. Stopping the CPU alters the system behavior. It may also take many clocks for the CPU to read each register. This makes it difficult to use the counters to observe fine grained behavior such as pipeline stalls and to see how two behaviors are correlated.

SUMMARY

A debugging architecture is provided that includes a set of debug counters that can be used to count one or more events based on a set of signals from a device being monitored. The architecture provides for observing the outputs of the debug counter during operation of the device by providing the contents of the debug counters on an output bus (e.g., Debug Bus) for the device being monitored.

One embodiment includes a set of counters that receive a set of signals from the device being monitored during operation of that device. The counters count one or more events based on the received set of signals. The system includes an output bus interface that is in communication with the counters and an output bus. The output bus can be a special bus for providing the counter data or an existing bus (such as the existing Debug Bus). The output bus interface receives counter data from the counters and provides that data to the output bus. In some embodiments, rather than using counters, a different circuit can be used to calculate a different metric for the device being monitored.

In one embodiment, the sum of the widths of the counters is greater than the width of the output bus. Thus, it may not be practical to present all of the counter data simultaneously. Instead, the system will rotate through the counter values sequentially (or in another order), presenting different counter values (or subsets of counter values or combinations of subsets of counter values) over the output bus. Alternatively, a subset of bits for each counter (or a subset of counters) can be simultaneously presented on the output bus. The subset of bits could be the least significant bits, middle bits, of other subsets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a block diagram of a device that includes an observation block for debugging purposes.

FIG. 5 is a block diagram of one embodiment of a set of counters.

FIG. 6A is a flow chart describing one embodiment of a process for observing debug information.

DETAILED DESCRIPTION

A debugging architecture is provided that includes a set of debug counters that can be used to count one or more events based on a set of signals from a device being monitored. The architecture provides for observing the outputs of the debug counters during operation of the device. The counters and the other hardware/software associated with the counters can be implemented within the device being monitored or external to that device.

Figure 1:
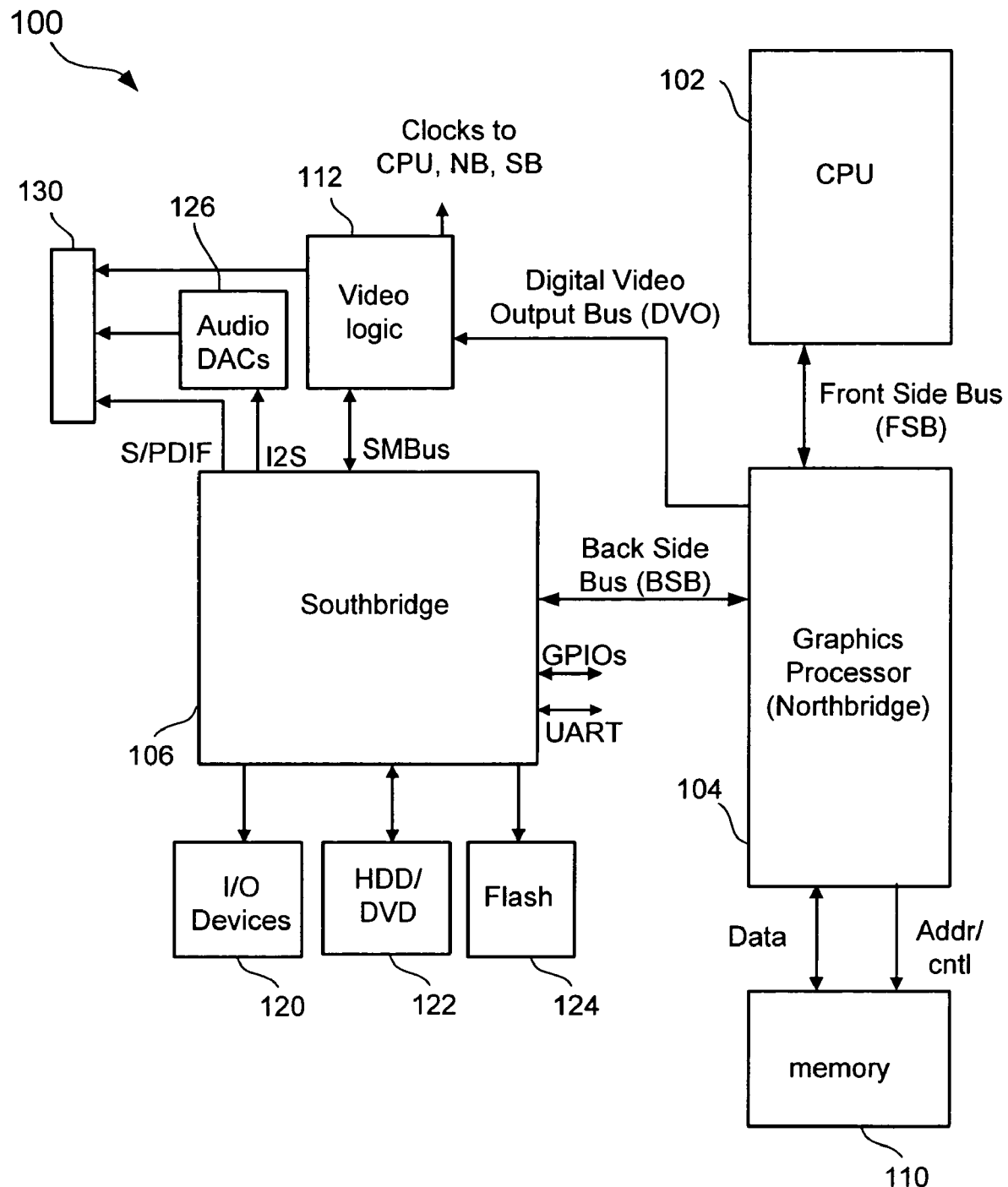
FIG. 1 is a block diagram of a computing system.

FIG. 1 provides one example of a computing device 100 that can be used in conjunction with the technology described herein to observe the outputs of the debug counters (or other metric determination apparatus) during operation of computing device 100. Note that other computing systems can also be used, including personal computers, workstations, handheld computing devices, portable computing devices, telephones, set top boxes, etc. Additionally, the technology described herein to observe the outputs of the debug counters (or other metric determination apparatus) can be used with many different types of devices, including device that are not considered to be computing devices.

Computing device 100 includes a Central Processing Unit (CPU) 102, a graphics processor (also called a Northbridge) 104 and a Southbridge 106. CPU 102 and Northbridge 104 communicate with each other via a Front Side Bus (FSB). Northbridge 104 communicates with memory 110 via address/control lines (Addr/cntl) and data lines (Data). Northbridge 104 is used to provide graphics processing functions, provide memory functions, and serve as an intermediary between CPU 102 and Southbridge 106.

Northbridge 104 communicates with Southbridge 106 via a Backside Bus (BSB). Southbridge 106 performs various I/O functions, audio processing and testing functions. Southbridge 106 is in communication with I/O devices 120 (e.g., network interface), hard disc drives and DVD drives 122, and flash memory 124. System 100 also includes video logic 112. Northbridge 104 communicates with video logic 112 via a Digital Video Output Bus (DVO). Video logic 112 includes clock generation circuits which provide clocks to CPU 102, Northbridge 104 and Southbridge 106.

As discussed above, Southbridge 106 provides various audio processing. Southbridge communicates with digital to analog converters 126 via an I2S Bus. I2S is a standard digital audio chip-to-chip unidirectional interface. In its basic form, it consists of a sample clock (SCLK), a master clock (MCLK), a left/right indicator (LRSEL), and a data line. An interface 130 is included for connecting system 100 to components outside the system. Southbridge 106 is connected to interface 130 directly. In other embodiments, it can be connected indirectly. In addition, digital to analog converters 126 and video logic 112 are also connected to interface 130.

During the development of system 100, the designers may wish to observe various components of the system in order to debug the system or for other reasons. Additionally, developers of software may wish to monitor various components of system 100 in order to debug the software. To monitor the components, a debugger will observe events or metrics. A metric is a value, property, behavior, or condition. An event is defined as a state or change of a metric. On example of a metric is the number of writes to RAM and an example of a corresponding event is an actual write operation to the RAM. The discussion below provides for a debugging architecture that can continuously provide information about one or more metrics.

For example, FIG. 2A depicts a system 200 that includes an Operational Device 230 that is to be observed for debugging or other purposes. Operational Device 230 can be any of the components depicted in FIG. 1 or portions of those components, as well as other component in other systems. For example, Operational Device 230 can be a portion of CPU 102, a portion of Graphics Processor 104, are a portion of SouthBridge 106, or other circuit. Operational Device 230 may include muxing, decoding, and other logic to generate a set of signals which may be observed and/or counted. These signals are labeled in FIG. 2A as "Signals Under Observation." The "Signals Under Observation" are presented to Debug Observation Block 220. In one embodiment, Debug Observation Block 220 is an electrical circuit (or set of electrical circuits), as described below. Multiplexers and/or other logic for selecting and generating the "Signals Under Observation" may be affected or controlled by "Observation Control" signals sent from Debug Observation Block 220 to Operational Device 230.

The output of Debug Observation Block 220 is a bus referred to as Debug Bus 234. In one embodiment, Debug Bus 234 is 64 bits wide and is a streaming bus (e.g., provides streaming data). In other embodiments, Debug Bus 234 can be 32 bits wide or another width suitable for the particular implementation. Debug Bus 234 is an output bus. That means that the Debug Bus 234 can be used to output data to an entity external to the component that generates it (see FIG. 2A). An output bus can also be used to input data. Thus, an output bus includes an output only bus, as well as an input and output bus.

Both Operational Device 230 and Debug Observation Block 220 are in communication with Register and Control Interface 210. In one embodiment, Register and Control Interface 210 could include a CPU or other hardware for controlling operation. Register and Control Interface 210 can be accessed via signals 232 from a CPU or other hardware device. Debug bus 234 is provided to a data gathering device (e.g., a logic analyzer) for accumulating the data observed. This data can then be analyzed by a computer or other entity in order to determine certain behavior of the system.

Figure 2B:
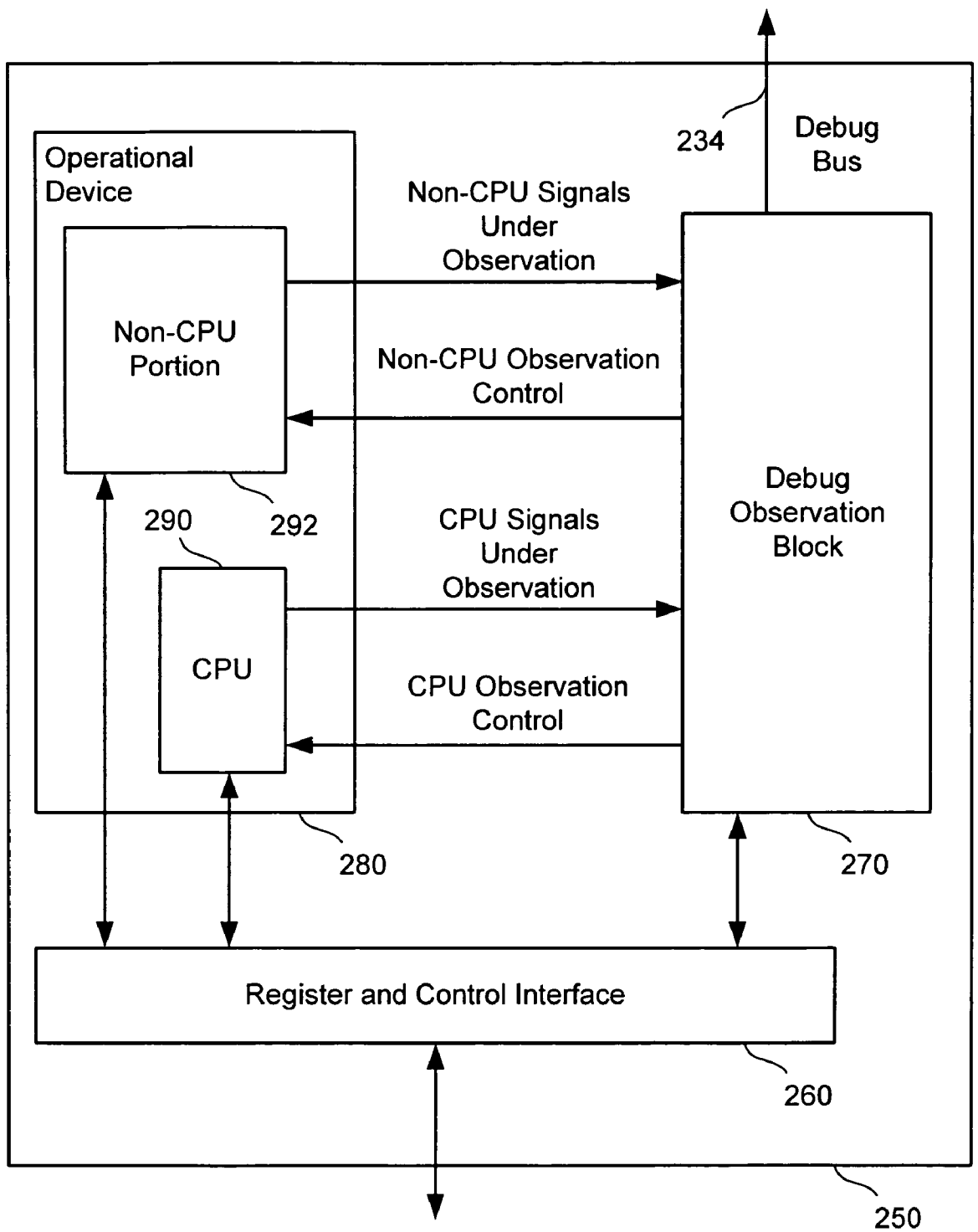
FIG. 2B is a block diagram of a device that includes an observation block for debugging purposes.

FIG. 2B is a block diagram of another embodiment of a system that includes an Operational Device being observed. In the embodiment of FIG. 2B, Operational Device 280 includes a portion of the CPU 290 and a hardware component 292 that is not part of a CPU. Both portions 290 and 292 are being observed by Debug Observation Block 270. The output of Debug Observation Block 270 is provided on Debug Bus 234 for an external system to analyze. CPU portion 290 (which can be a portion of CPU 102) provides CPU Signals Under Observation to Debug Observation Block 270. Debug Observation Block 270 provides CPU Observation Control signals to CPU 290 in regard to selecting signals or triggering information. Similarly, Non-CPU Portion 292 provides Non-CPU Signals Under Observation to Debug Block 270 and receives Non-CPU Observation Control from Debug Observation Block 270. Both CPU Portion 290 and Non-CPU Portion 292 are in communication with Register and Control Interface 260. Debug Observation Block 270 is also in communication with Register and Control Interface 260, receiving and providing various control information. Register and Control Interface 260 exchanges data with other components on or off system 250.

Figure 3:
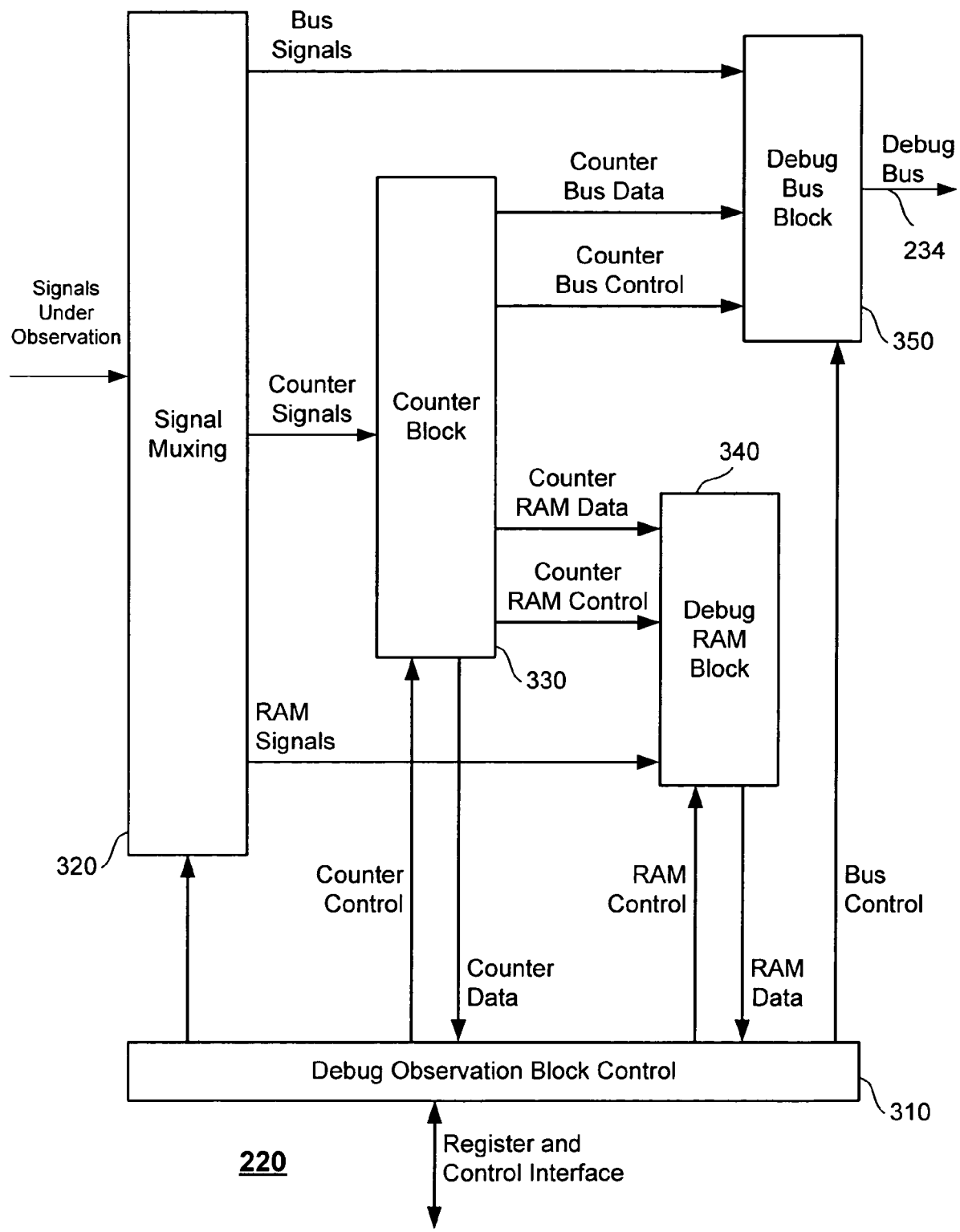
FIG. 3 is a block diagram depicting one embodiment of an observation block.

FIG. 3 is a block diagram of the components of one embodiment of Debug Observation Block circuit 220. Debug Observation Block Control 310 contains registers and/or other logic to pass the signals to other blocks and to tell the other blocks what to do. For example, Debug Observation Block Control 310 is in communication with Signal Muxing 320, Counter Block 330, and Debug RAM Block 340. Other entities can access information in Debug Observation Block Control 310 via a register and control interface.

Signal Muxing 320 is a set of one or more multiplexers which receive the Signals Under Observation. In one embodiment, the Signals Under Observation can be any of these signals within Operational Device 230 that are being observed. Based on control signals from Debug Observation Block Control 310, Signal Muxing 320 can provide all or a subset of the signals to Debug Bus Block 350 via the Bus Signals, all or a subset of the Signals Under Consideration to Counter Block 330 (see Counter Signals), or all or a subset of the Signals Under Observation to Debug RAM block 340 via the RAM Signals. The Operational Device itself and/or an entity outside of Operation Device 230 can program which signals should be sent to Debug Bus Block 330, Counter Block 350 or Debug RAM Block 340 by programming various registers via Debug Observation Block Control circuit 310.

Counter Block 330 includes a set of counters that can be controlled (see Counter Control) by Debug Observation Block Control 310. Based on the Counter Control signals and the Counter Signals (provided from Signal Muxing 320), Counter Block 330 will count the number of times a particular event or condition occurs. For example, the system may count the number of Level 1 cache misses, Level 2 cache misses, cast outs, floating point operations, occurrences that data is loaded right after being stored in the cache, branches, branch mispredictions, or any other condition, behavior, or parameter of the system. In other embodiments, circuits can be used other than counters in order to determine one or more other metrics for the system. For example, rather than having a counter, a circuit can be used to store a highest value of a condition, lowest value of a condition, average value of a condition, existence of a condition, etc. The technology described herein is not limited to any particular type of metric or means for determining that metric. The use of a counter is just one example provided for explanation purposes. In addition to sending the Signals Under Observation to Counter Block 330 via the Counter Signals, Signal Muxing 320 can also provide Signals Under Observation to Debug RAM Block 340 via the RAM Signals for storage in the RAM. This information can be accessed via RAM data through the Debug and Observation Block Control 310.

In the past, counters were generally accessed via a control interface such as Debug Observation Block Control 310. However, the system of FIG. 3 allows the output of the counters to be provided to Debug Bus 234 via the Debug Bus Block 350. That is, the Debug Bus Block 350 is used to connect the counters to the debus bus. The counters send the counter data to Debug Bus Block 350 via the Counter Bus Data signals. Counter Block 330 also sends Counter Bus Control signals to Debug Bus Block 350 for controlling how Debug Bus Block 350 uses Counter Bus Data. Debug Observation Block Control 310 can also send Bus Control signals to Debug Bus Block 350 to indicate how the Counter Bus Data should be handled by Debug Bus Block 350. In addition, the output of the counters can also be provided to Debug RAM block 340 via the Counter RAM data signals. The Counter RAM Control signals are used to indicate to Debug RAM block 340 how to handle the Counter RAM data.

Figure 4:
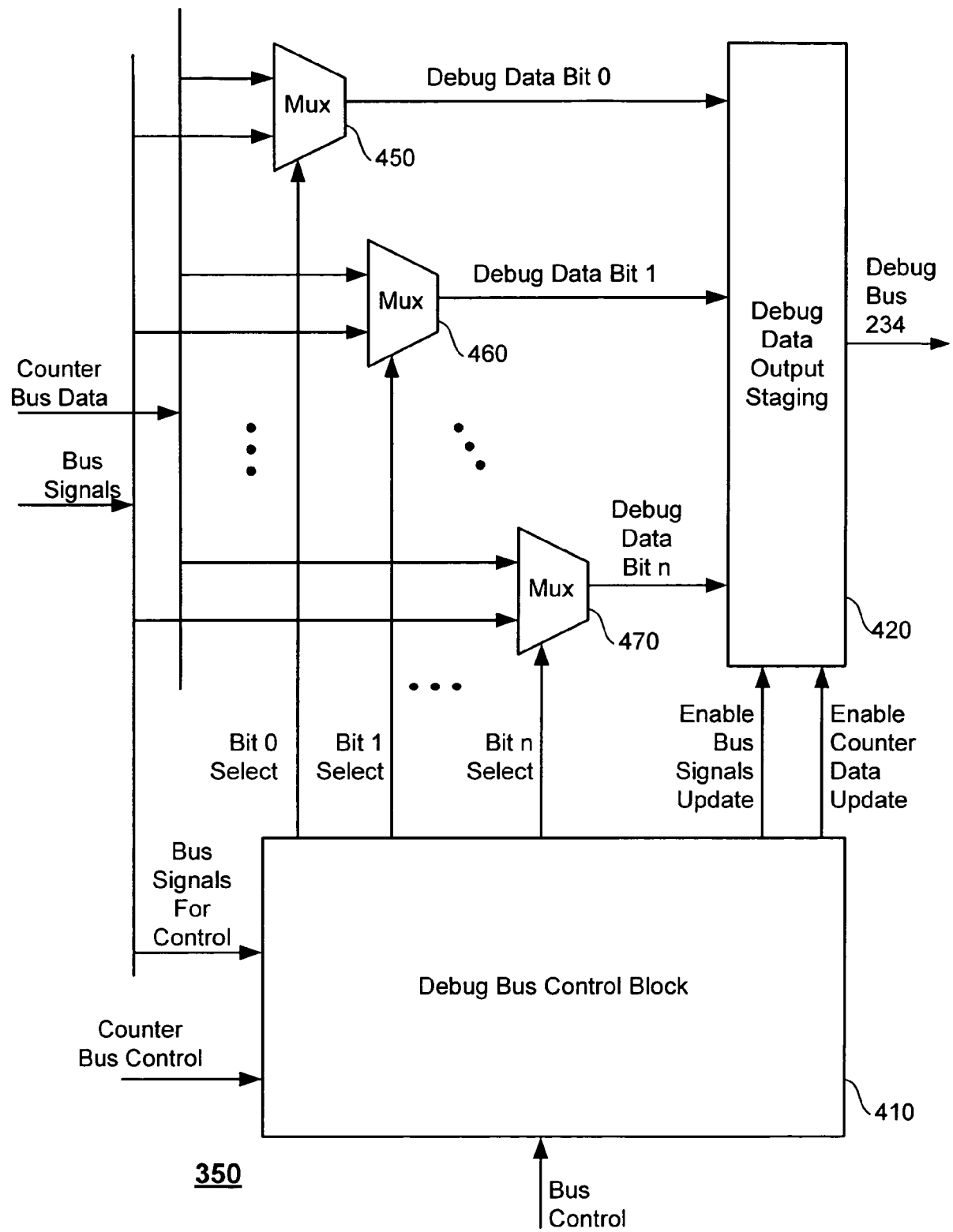
FIG. 4 is a block diagram depicting one embodiment of a Debug Bus block used as a bus interface.

FIG. 4 is a block diagram describing one embodiment of the components of Debug Bus Block 350. Debug Bus Block 350 includes a Debug Bus Control Block circuit 410 which sends control signals to a set of multiplexers 450, 460, . . . , 470. Debug Bus Control Block 410 also sends an Enable Bus Signals Update signal and Enable Counter Data Update signal to Debug Data Output Staging 420. Debug Bus Control Block 410 receives the Counter Bus Control signal from Counter Block 330 and receives the Bus Control signals from Debug Observation Block Control 310.

The Bus Signals received by Debug Bus Block 350 are sent to the various multiplexers (450, 460, . . . , 470) so that one bit of the Bus Signals is sent to each multiplexer. Additionally, the Counter Bus Data is sent to the various multiplexers (450, 460, . . . , 470) so that one bit of the Counter Bus Data is sent to each multiplexer. For each bit on Debug Bus 234, there is a corresponding bit in the Counter Bus Data in addition to the data being sent via the Bus Signals. For each bit, the control signal (bit 0 select, bit 1 select, . . . , bit n select) indicates whether the data should be sourced from the Counter Bus Data or Bus Signals.

The Enable Bus Signals Update signal causes Debug Bus 234 to be updated with the Bus Signals. The Enable Counter Data Update Signal causes Debug Bus 234 to be updated with the Counter Bus Data. Debug Data Output Staging circuit 420 can be any type of staging suitable for the particular implementation. If data is continuously driven, then output staging may not be needed. In other embodiments, latching or logic can be used to stage the data. Debug Bus Control Block 410 may use a combination of information from Counter Bus Control, Bus Control and the Bus Signals to determine when counter data should be passed to Debug Bus 234. Any combination of bits can come from the counter data. The bits chosen can also change over time. This change may be a periodic change or may be in response to input from Counter Bus Control.

FIG. 5 is a block diagram describing one embodiment of Counter Block 330. In one embodiment, the counter block includes 16 counters. In other embodiments, more or less than 16 counters can be used.

Each of the various Counter Signals are provided to one of the Count Enable Controls. For example, Signal 0 is provide to Count 0 Enable Control 550, Signal 1 is provided to Count 1 Enable Control 560, . . . , Signal N is provided to Count N Enable Control 570. In one embodiment, there is one counter for each signal provided to Counter Block 330. In other embodiments, there can be more signals than counters, or less signals than counters. Each of the Count Enable Controls (550, 560, . . . , 570) are provided a control signal (Count 0 Control, Count 1 Control, . . . , Count N Control) from Control Counter Block 510, which also receives the various counter signals. Each of the Enable Control circuits (550, 560, . . . , 570) provide an increment count signal to the respective counters 555, 565, . . . , 575. The output of each of the counters 555, 565, . . . , 575 are provided to multiplexer 520 and Counter Control Block 510. Counter Control Block 510 also receives the Counter Control signal from Debug Observation Block Control 310. Furthermore, Counter Control Block 510 provides a Counter Bus Control signal to Debug Bus Block 350. Counter Control Block 510 also provides a Mux Select signal to multiplexer 520 in order to select the appropriate data to send as the Counter Bus Data. In one embodiment, Counter Control Block 510 uses the Mux Select signal to choose one of the counters at any given time to provide data for Debug Bus 234. The Counter Bus Data from multiplexer 520 is provided to Debug Bus Block 350, as depicted in FIG. 3.

For each counter (555, 565, . . . , 575) there is an Enable Control circuit (550, 560, . . . , 570) which indicates when the counter should increment. This is determined by the signal value and the control signal from Counter Control Block 510. The counters can be used to count the clocks where a particular signal is zero, count a number of clocks where the particular signal is one, count positive edge transitions, count negative edge transitions, etc. The output of each counter can be read via Counter Control Block 510. In addition, the Counter Control Block 510 can sequentially (or in another order) select each counter to drive the Counter Bus Data via multiplexer 520. As each counter is selected, the Counter Bus Control signal indicates to Debug Bus Block 350 that the new counter value should be presented on Debug Bus 234. In one embodiment, there can be a fixed number of Debug Bus bits dedicated to the Counter Bus Data. In other embodiments, the number of bits can be dynamic.

In one embodiment, counters can be turned on or off using various triggers. For example, one trigger can indicate that execution of a particular instruction or execution of an instruction at a certain instruction address start or stop a counter. For example, a register can hold a value that is compared against an instruction pointer.

FIG. 6A is a flow chart describing one embodiment for a process for operating the Debug Observation Block 220 described in FIGS. 2A-5. In step 600, Debug Observation Block 220 will gather data from Operational Device 230. For example, various signals from inside Operational Device 230 will be provided to Debug Operational Block 220. In step 602, various metrics are determined. One example could include using counters to count various events. In other embodiments, other types of circuits can be used to determine metrics. For example, processors can be used and/or other specific circuits to measure whether certain conditions exist or not. In step 604, the data gathered in step 600 and/or the metrics determined in step 602 are provided to Debug Bus 234. For example, the values of the counters in Counter Block 330 are provided to Debug Bus 234. In step 606, the data gathered in step 600 and/or the metrics determined in step 602 are provided to a storage device such as a RAM (e.g. see RAM 340). In step 608, a data gathering device will gather the data from Debug Bus 234 or from the storage device. This data can then be stored in a persistent manner and/or organized for future analysis. In step 609, the data gathered in step 608 is analyzed. In one example, a logic analyzer can be used to gather the data in step 608, and a computer can be programmed to access the data from the logic analyzer and analyze the data in any manner appropriate for the particular user needed in step 620.

Figure 6B:
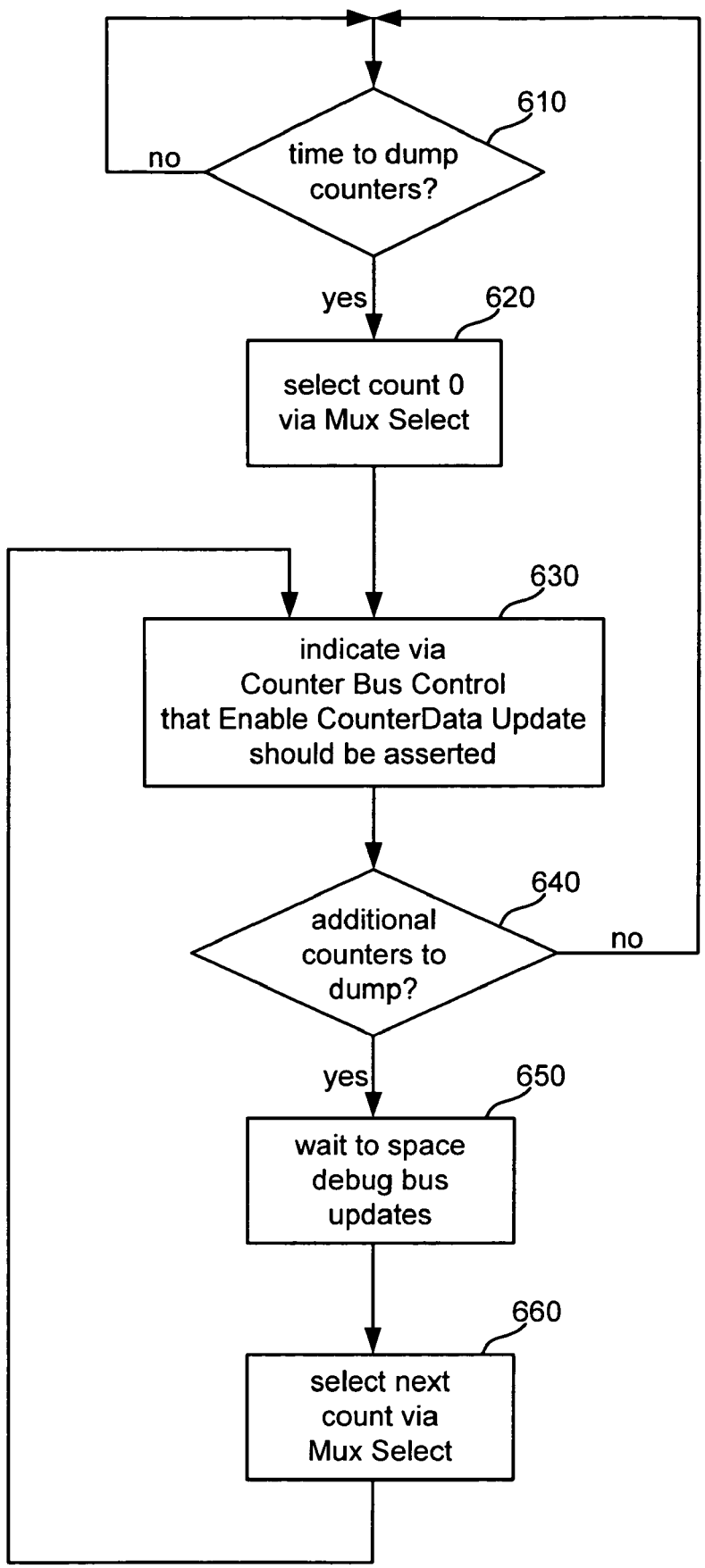
FIG. 6B is a flow chart describing one embodiment of a process for providing data to a Debug Bus.

FIG. 6B is a flow chart describing more details of one embodiment of the process of providing data/metrics to the Debug Bus (see step 604 of FIG. 6A). The embodiment described in FIG. 6B pertains to using counters to determine the various metrics. In one embodiment, data from counters is provided on Debug Bus 234 periodically. Thus, in step 610 of FIG. 6B it is determined whether it is time to provide the value of the counters to Debug Bus 234.

If the time waited to provide the counter data is increased, then the accuracy of the counter value sent out the bus is decreased. However, much less data is produced at the Debug Bus. This may make it simpler to handle the data stream string.

Referring to step 610, if it is not time to provide the counter data, the system will wait until it is the appropriate time. If it is time to provide the contents of the counters to Debug Bus 234, then the first counter (e.g., Count 0) will be selected via the appropriate Mux Select signals in Step 620. For example, Mux Select signal of FIG. 5 is used to select the value of Count 0 (555). The Mux Select signal is driven by Counter Control Block 510. By selecting Count 0, the contents of counter 555 is provided as Counter Bus Data to Debug Bus Block 350. In step 630, Counter Control Block 510 will indicate via the Counter Bus Control signal to Debug Bus Block 350 to Enable Counter Data Update. Debug Data Output Staging 420 will provide the new counter data on to Debug Bus 234 by using the appropriate latches, registers, combination of logic, etc. In step 640, it is determined whether there are more counters to provide on Debug Bus 234. If there are no more counters in the counter block 330, then the iteration is done and the process loops back to Step 610. If there are more counters that have not been accessed in the current iteration, the process continues in step 650.

Step 650 includes waiting a period of time in order to space the bus updates. For example, suppose the equipment observing Debug Bus 234 observes the signals at a frequency of 100 MHz or less; however, the counter data could be provided on the Debug Bus 234 at a rate of 500 MHz. By waiting between updates, the data rate on Debug Bus 234 is slowed to match the operational data rate of the equipment observing Debug Bus 234. This can reduce the cost of the observation equipment. After waiting the appropriate amount of time in step 650, the next counter is selected via the Mux Select signal in step 660 and the process continues at step 630.

Figure 7:
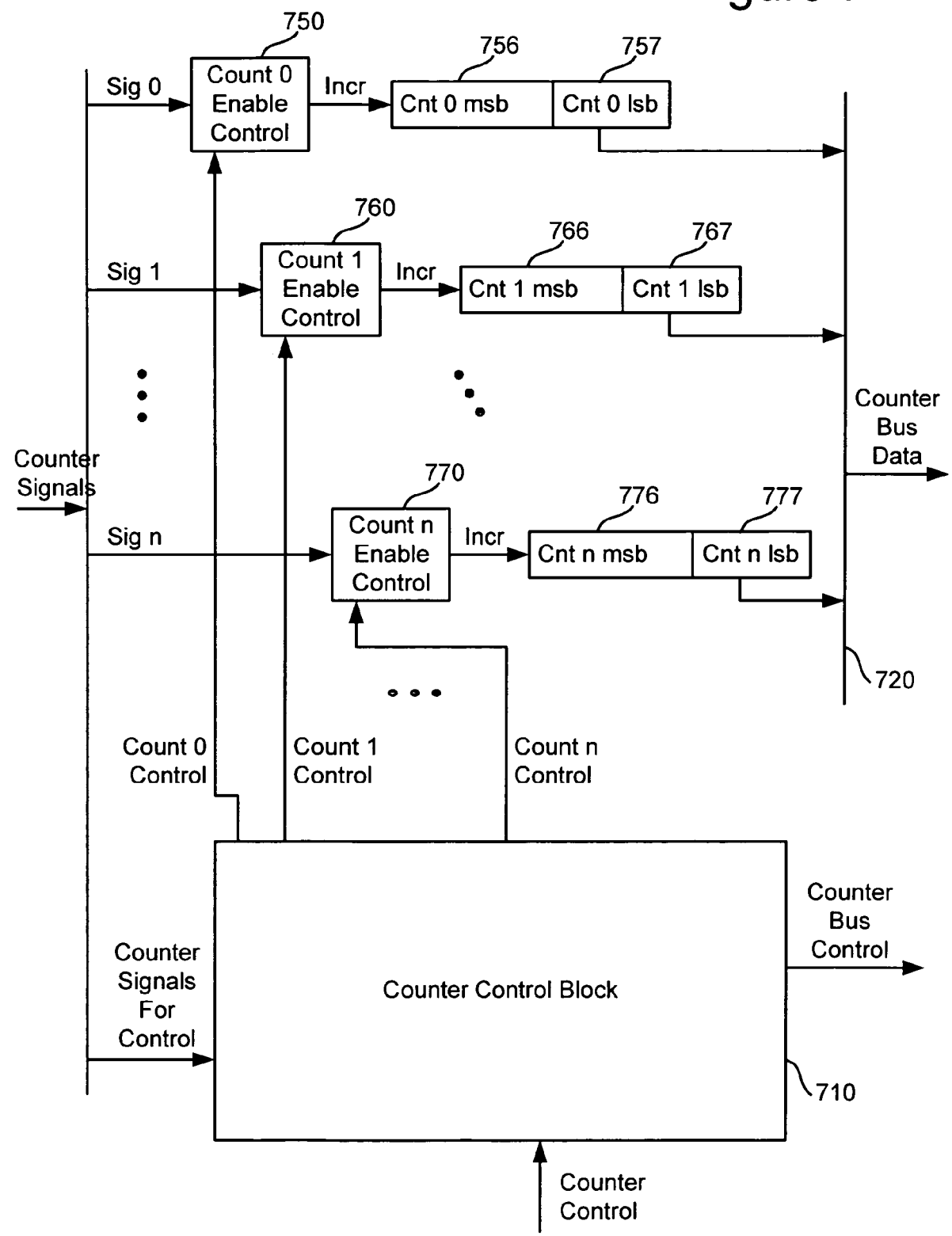
FIG. 7 is a block diagram depicting one embodiment of a set of counters.

FIG. 7 shows an alternative embodiment for Counter Block 330. Counter Control Block 710 is similar to Counter Control Block 510 of FIG. 5. Count Enable Controls 750, 760, . . . , 770 are similar to the Count Enable Controls 550, 560, . . . , 570 of FIG. 5. One difference is that instead of providing the entire output of the counter to the Counter Bus Data, only a portion of each counter output is provided to the Counter Bus Data. That is, each counter output is N bits. However, only M bit are provided to the Counter Bus Data, where N is greater than M. Because only a subset of bits for each counter are provided to the bus 720, the data from multiple counters can be provided to the bus at the same time. In one embodiment, data from all the counters are provided to the bus at the same time. In other embodiments, data from less than all counters (but more than one counter) will be provided to the bus at a single given moment.

In one example, each counter has a 32 bit output. The bits of the counter outputs can be divided into the most significant bits and least significant bits. One example implementation includes providing only the least significant bits to the Counter Bus Data for presentation on Debug Bus 234. As long as enough least significant bits are sent for the given clock rate (end clocks), then the least significant bits will not alias. In other words, the amount that each counter is incremented can be reconstructed from the least significant bits. For example, suppose a counter can increment every clock. Further, suppose a counter's least significant bits will be sent out on Debug Bus 234 every four clocks. In the period between transfers, the value of the counter can increment by only four or less (0B100). If the lower three bits of the counter value are sent, then no aliasing of the least significant bits will occur and the value of the increment can be determined by comparing the lower bits of the counter on consecutive transfers. In general, if the least significant bits are transferred at every N clocks, then at least K least significant bits of the counter need to be sent, where $2^K > N$.

Figure 8:
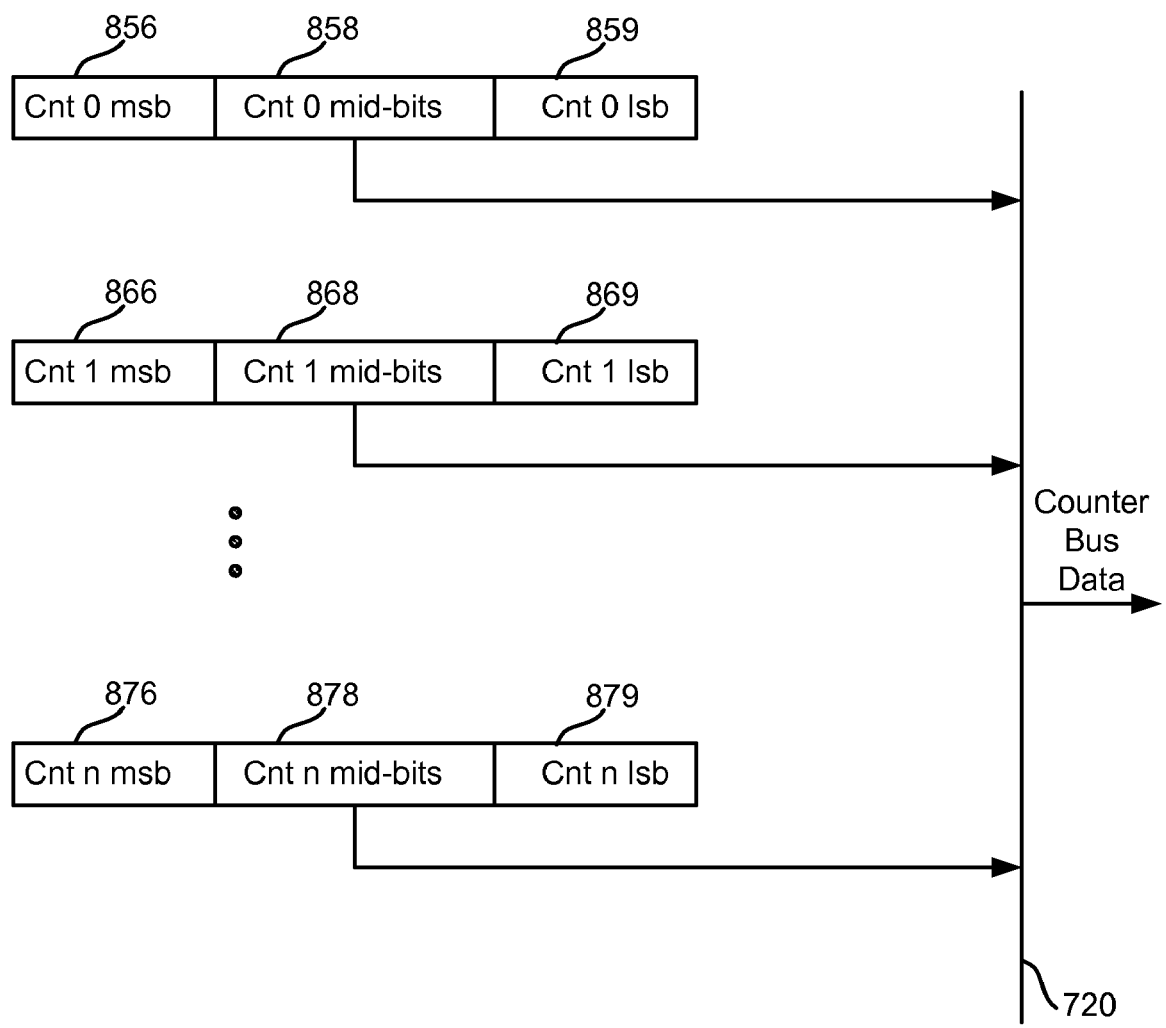
FIG. 8 depicts an alternative implementation for a set of counters.

FIG. 8 shows another alternative for providing the counter values to the Debug Bus. In this embodiment, instead of sending the least significant bits, middle bits of each counter are provided at the same time. For example, counter 0 may have the most significant bits 856, middle bits 858, and least significant bits 859. Counter 1 may have most significant bits 866, middle bits 868, and least significant bits 869. Counter N may have a most significant bits 876, middle bits 878, and least significant bits 879. In this embodiment, the middle bits are provided to the counter bus data. The middle bits can be thought of as the upper portion of the least significant bits. It may be more advantageous to send only upper portion of the K least significant bits in a counter. This reduces the accuracy of the counter. However, it allows the values of more counters to be presented at the same time. Note that the scheme in FIG. 8 can be used with the circuitry depicted in FIG. 7. In some embodiments, middle bits for less than all counters can be presented at the same time.

In another embodiment, the output of the counters can be loaded into shadow registers. In this manner, even if the counter data is provided to the Debug Bus at different times, they will be stored in the shadow register at the same time to guarantee that values from different counters match in time.

Note that the approaches in FIGS. 5, 7, and 8 are not mutually exclusive. They can be combined. For example, entire counter values can be sent less often while the least significant bits of the counters may be sent together more often. If the number of least significant bits exceeds the width of the Debug Bus, then the controller may group the least significant bits into multiple sets. It can then send these sets sequentially using the multiplexing method associated with FIG. 6B. Additionally, the shadow register as described above can be used for all or a subset of counters. Other combinations can also be used.

Figure 9:
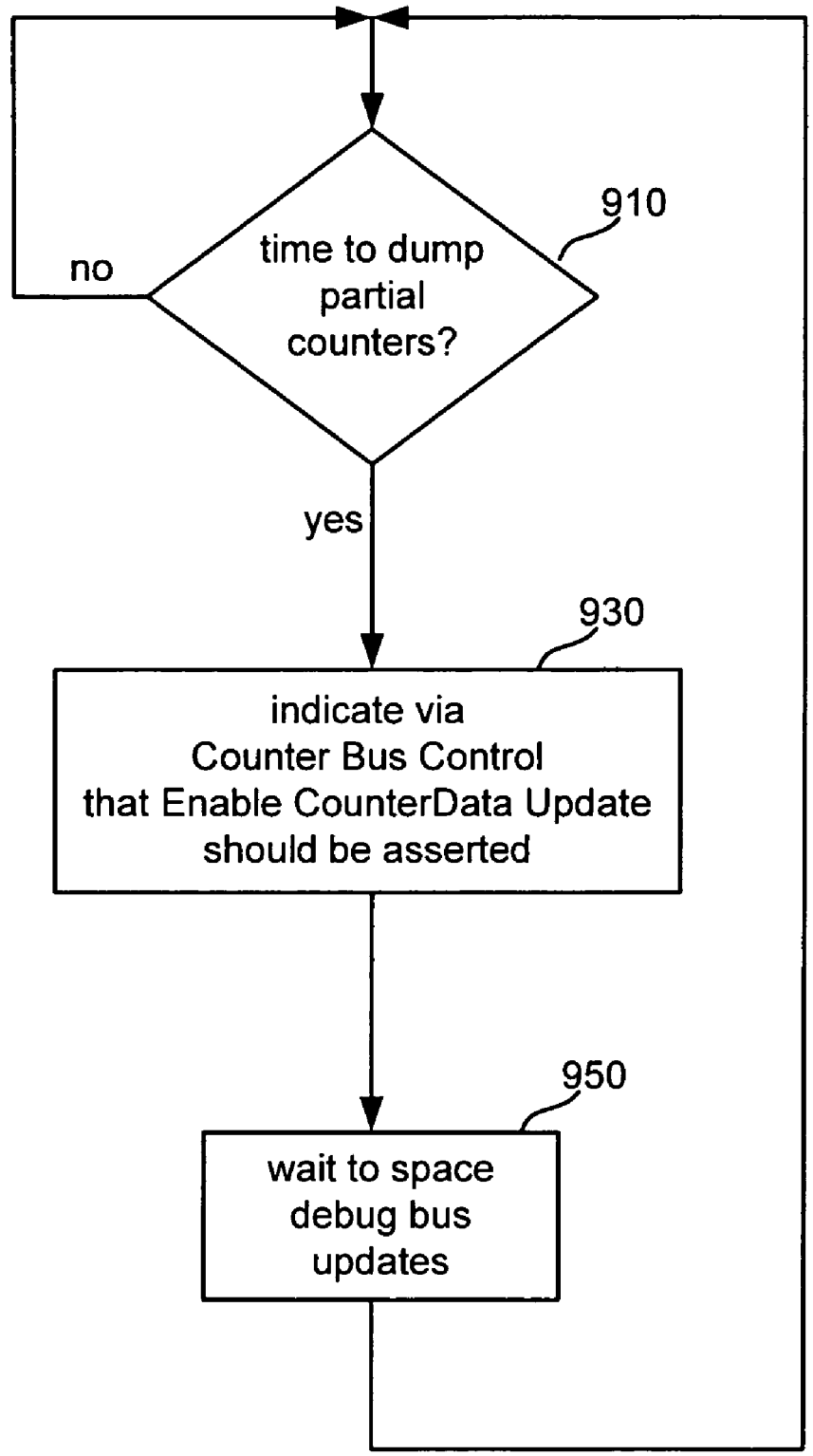
FIG. 9 is a flow chart describing one embodiment of a process for providing data to a Debug Bus.

FIG. 9 is a flow chart that explains the operation of the counter block in accordance with FIG. 7 or 8. In Step 910, it is determined whether it is time to provide the counters on the Debug Bus. Step 910 is similar to Step 610 of FIG. 6B. If it is not the appropriate time, the system will wait. If it is time to provide the counters, then in step 930, Counter Control Block 510 indicates to Debug Bus Block 350 via the Counter Bus Control signal that the Enable Counter Data Update Signal should be asserted. This is similar to step 630 of FIG. 6B. Note that step 930 provides for the data from the various counters to be simultaneously presented to the Debug Bus 234. That is, the least significant (or middle) bits from all (or a subset of) the counters are packaged onto the Debug Bus at the same time. In step 950, the system waits to space out the Debug Bus updates, as described above with respect to FIG. 6B.

Figure 10:
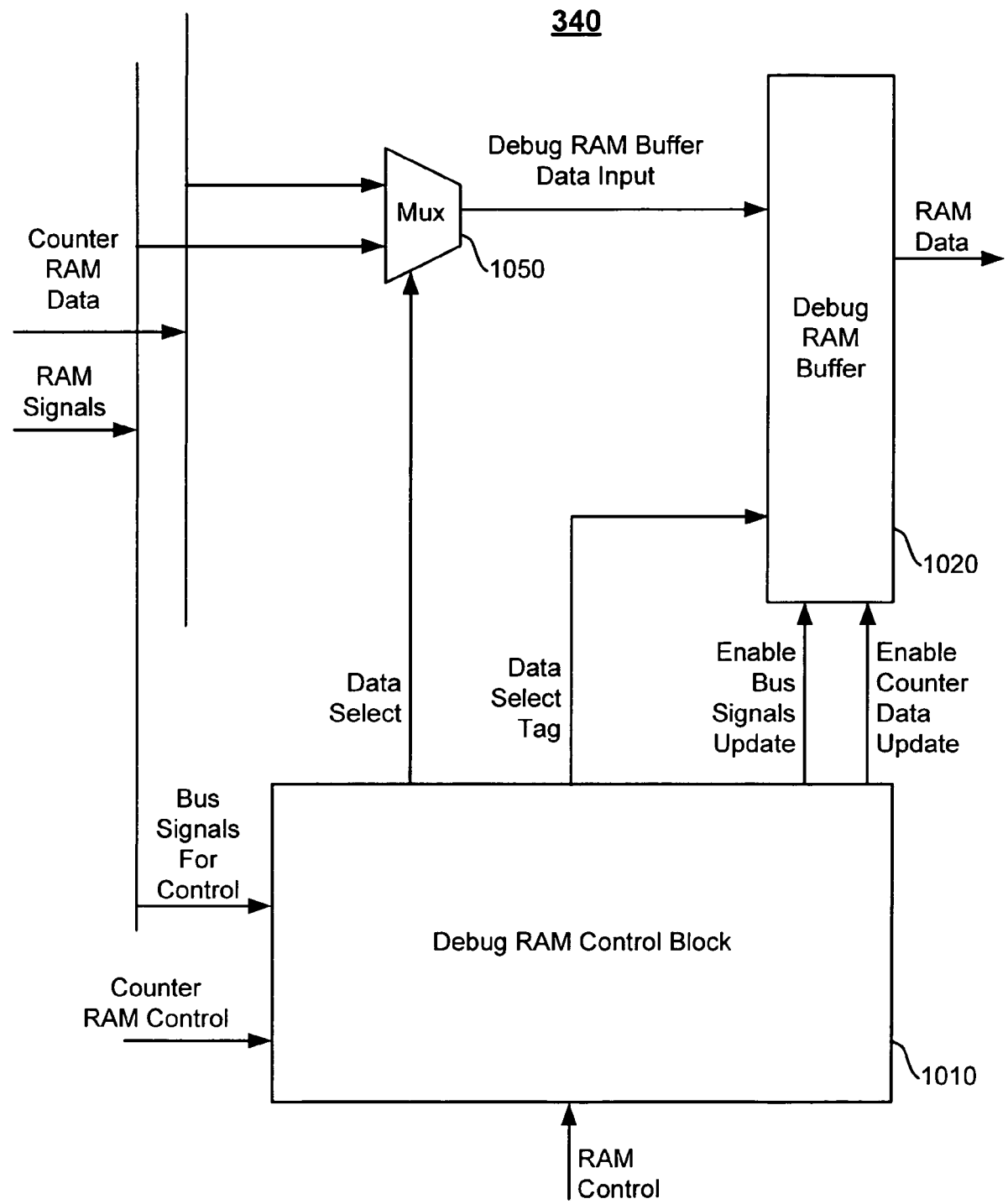
FIG. 10 is a block diagram of one embodiment of a RAM and associated structures used for debugging a system.

FIG. 10 is a block diagram describing the components of one embodiment of Debug RAM block 340. FIG. 10 depicts Debug RAM Control Block 1010 in communication with Debug RAM Buffer 1020 and Multiplexer 1050. Multiplexer 1050 receives Counter RAM data from Counter Block 330 and RAM Signals from Signal Muxing 320, and selects between the two based on the Data Select signal from Debug RAM Control Block 1010. The RAM Signals are also provided to Debug RAM Control Block 1010, as is the Counter RAM Control Signal from Counter Block 330. Debug RAM Control Block 1010 also receives RAM Control signals from the Debug Observation Block Control 310. Based on the input information, Debug RAM Control Block determines which set of data multiplexers 1050 should select. That selected data is provided to the Debug RAM buffer 1020, which is any conventionally known RAM suitable for the particular implementation. Debug RAM Control Block 1010 also provides Enable Bus Signal Update and Enable Counter Data Update to Debug RAM Buffer 1020. These two enable signals are similar to the enable signals provided by the Debug Bus Control Block 410. Debug RAM control block 1010 also provides a data select tag to debug RAM buffer 1020. The data select tag is written to the RAM to identify which type of data is in each RAM location (e.g., Counter RAM Data or RAM Signals). This makes it easier to reconstruct the two streams of data.

Because data is being written to a single RAM, the entire RAM entry must be written. Instead of mixing RAM Signals and Counter RAM Data on a bit by bit basis, Control Block 1010 selects either the RAM Signals or Counter RAM Data. Control Block 1010 uses a register value stored within Debug Observation Control 310 to determine which data to select and when to write it. The process of sending data from the Counter Block 330 to Debug RAM Block 340 is the same as is described above with respect to sending data from the Counter Block 330 to the Debug Bus block 350. In other embodiments, multiple RAMs can be used, each with their own control. Additionally, other implementations include choosing between the Counter RAM Data and RAM Signals dynamically.

Figure 11:
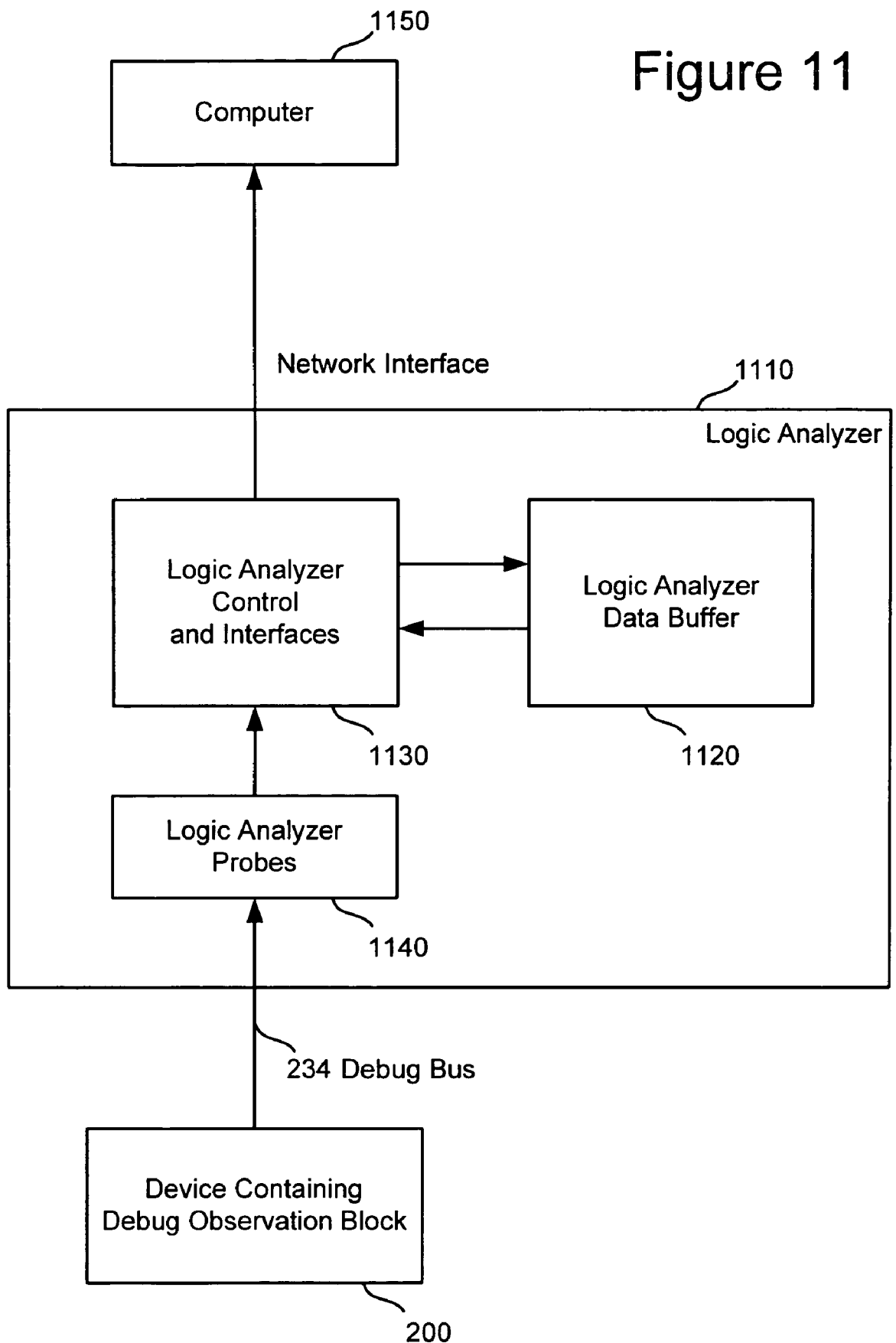
FIG. 11 is a block diagram of one embodiment of a debugging system.
Figure 12:
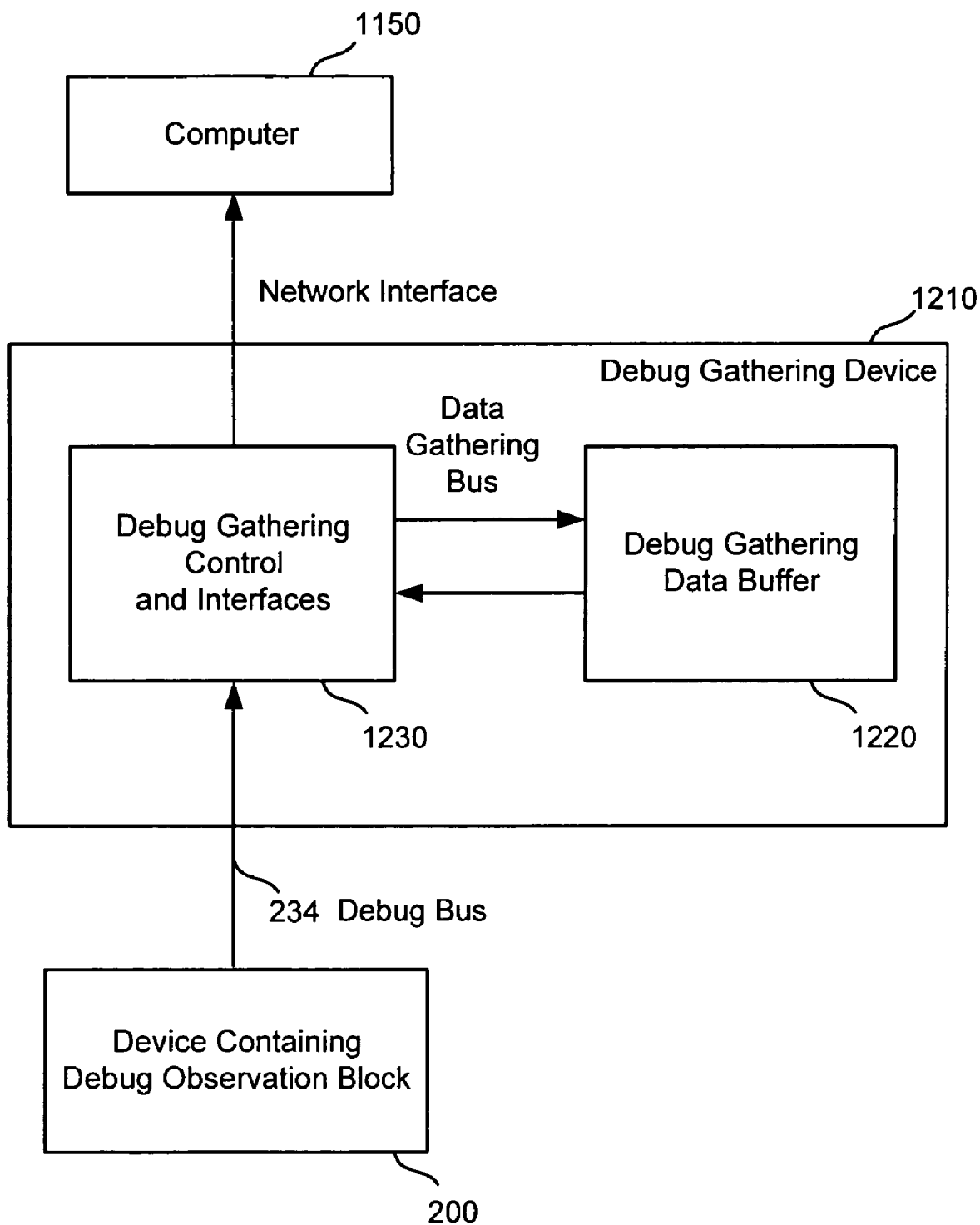
FIG. 12 is a block diagram of one embodiment of a debugging system.

FIGS. 11 and 12 provide two embodiments that explain how the data from the Debug Bus 234 can be captured and used for later examination. FIG. 11 shows the Device containing in Debug Observation Block 200 providing Debug Bus 234 to a Logic Analyzer 1110. In one embodiment, Logic Analyzer 1110 includes the Logic Analyzer Probes 1140, Logic Analyzer Control and Interfaces 1130, and Logic Analyzer Data Buffer 1120. Debug Bus 234 is in contact with Logic Analyzer Probe 1140 which provides data to Logic Analyzer Control and Interfaces 1130. The data probed is then stored in Logic Analyzer Data Buffer 1120. Computer 1150 is in communication (via a network) with Logic Analyzer Control and Interface 1130 for accessing data in Data Buffer 1120. In one embodiment, Computer 1150 is a personal computer; however, other computers can also be used. Computer 1150 can reconstruct the counter values from the subset of bits stored in the Logic Analyzer Data Buffer 1120. Computer 1150 can also provide a user interface for observing and analyzing the data. It is contemplated that, in one embodiment, Computer 1150 is used to perform the analysis of step 609 of FIG. 6A and a logic analyzer 1110 is used to perform the data gathering of steps 608 of FIG. 6A.

Logic analyzers can be very expensive. Because the capabilities of a logic analyzer may be worthwhile to a large number of developers, it may be valuable to develop a debug gathering device specifically designed to capture the data from the counters that cost less than a generically available logic analyzer. FIG. 12 illustrates such an embodiment. Debug bus 234 is provided from the device containing Debug Observation Block 200. The content of Debug Bus 234 is provided to a Debug Gathering Control and Interface 1230, which is a custom circuit designed specifically to gather Counter Data for the Debug Bus 234. This gathered data is stored in Debug Gathering Data Buffer 1220. Debug Gathering Control and Interfaces 1230 can then access the data in the Buffer 1220 and provide that data to Computer 1150 via a local area network interface. In this embodiment, Debug Gathering and Control Interfaces 1230 and Debug Gathering Data Buffer 1220 are part of a custom Debug Gathering Device 1210 which is likely to be cheaper than a logic analyzer. In one embodiment, the Debug Gathering Control and Interface 1230 can be built with discrete devices (e.g., FPGA, ASIC, etc.).

Typically the width of a Debug Bus would be fairly narrow because extra pins are expensive. It is, however, feasible to create a wider interface into the Debug Gathering Data Buffer 1220. The narrower, high speed, Debug Bus can then be demultiplexed onto the data gathering bus. This means that the RAM technology used to build the Debug Gathering Data Buffer 1220 can operate on a lower frequency, but with larger memories. This allows much more data to be gathered. In addition, Debug Gathering Control and Interfaces 1230 can use compression techniques to reduce the size of the data. Examples of such techniques include run length encoding; and storing only the lower bits of a counter (e.g., 8 out of 32 bits) and marking the data stream with the upper bits (e.g., 24 bits) are incremented. Note that run length encoding includes only writing data to memory when the counter values change.

Techniques to use the buffer more efficiently can be employed. An example of such a technique is using a linked list of buffers so that more space can be allocated to signals which change more often. For example, allocate 4K words in the Debug Gathering Data Buffer 1220 and a time to each counter. The system will write to the buffer when each of the counters change value. When the buffer fills, allocate a new buffer. Reserve one word in the buffer to point to the next buffer. This automatically allocates more memory to store the values of the counters which change more frequently.

The external device may also have more complex trigger mechanisms than those built into the device being monitored or a logic analyzer. For example, Data Gathering Control and Interfaces 1230 could contain a sequence of value sets. Each value set would include a counter value for each counter, a counter flag, and a dump flag. The counter flag indicates whether the counter value must equal or be less than the counter, and the dump flag indicates whether data should be transferred to the Debug Gathering Data Buffer 1220 while this set of values is being examined. Data Gathering Control and Interfaces 1230 could also recreate the counter values on the fly as it is received information over Debug Bus 234. A pointer refers to the current values. The set under consideration is satisfied when all counters match the values specified. When a set is satisfied, the pointer is updated to point to the next set of values. This is similar to the type of programming which can be done on logic analyzers.

The approach described above allows for the reading of the counter data without causing the CPU to stop its current operations. In many instances, the device being observed can run in its normal production mode and speed while the counters are providing the counter data to the Debug Bus. Even though counters may be read intermittently, the frequency at which they are read is enough to reconstruct the detail required. Additionally, multiple counter values can be provided on the bus close together in time, which enables the observation of multiple behavior and causation between them. As described, this solution can be implemented such that there is no or little change to system behavior of the device being observed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. An apparatus for observing a device, comprising:
a set of counters, said set of counters receives a set of signals from said device during an operational mode of said device, each counter maintains associated count data of a number of times an event occurs during said operational mode based on said set of signals;
a selection component, the selection component is coupled to an output of each counter;
a counter control circuit in communication with each counter and with the selection component;
a Debug Bus interface in communication with said selection component and said counter control circuit; and
a Debug Bus in communication with said Debug Bus interface, the counter control circuit, during said operational mode, provides a select signal to the selection component to select count data of the counters, and to provide the selected count data to the Debug Bus interface, where multiple bits of count data are selected at a time from at least one of the counters, the counter control circuit provides a control signal to the Debug Bus interface to provide the selected count data on the Debug Bus, and the Debug Bus has a width of multiple bits; the selection component comprises a multiplexer which selects multi-bit count data of different counters at different times, one counter at a time, and the different times are spaced apart so that the selected multi-bit count data is provided on the Debug Bus at a data rate which is less than a maximum data rate of the Debug Bus, and which matches an operational data rate of equipment which observes the Debug Bus.

2. An apparatus according to claim 1, wherein:
said Debug Bus interface continuously provides selected count data of said counters to said Debug Bus without stopping said device, said Debug Bus is a streaming bus.

3. An apparatus according to claim 1, further comprising:
an observation interface circuit in communication with said Debug Bus, said observation interface circuit receives said selected count data, said observation interface circuit includes a storage device, said storage device stores said received selected count data, said observation interface circuit outputs said selected count data from said storage device upon request.

4. An apparatus according to claim 1, wherein:
said Debug Bus interface provides said selected count data to said Debug Bus without stopping operation of a CPU for said device during said operational mode;
said Debug Bus is a streaming bus;
said apparatus further comprises a memory and a selection circuit;
said selection circuit receives said set of signals and selectively provides said set of signals to said set of counters, directly to said Debug Bus interface and to said memory.

5. An apparatus according to claim 1, further comprising:
a selection circuit, said selection circuit receives said set of signals and selectively provides said set of signals to said set of counters and directly to said Debug Bus interface; and
an observation block control circuit in communication with said selection circuit and said set of counters and said Debug Bus interface to provide control signals to said selection circuit and said set of counters and said Debug Bus interface, said set of counters provide a counter bus control output to said Debug Bus interface, said Debug Bus interface uses said counter bus control output to enable the selected count data to be provided on said Debug Bus.

6. An apparatus according to claim 1, wherein:
said Debug Bus interface provides said selected count data to said Debug Bus without stopping operation of a CPU for said device during said operational mode.

7. An apparatus according to claim 1, wherein:
the Debug Bus interface includes a staging circuit which stages the selected count data before the selected count data is provided to the Debug Bus.

8. A method for observing a device, comprising:
receiving a set of signals during operation of said device indicative of events occurring during said operation of said device;
operating a set of counters based on said signals;
presenting outputs of said counters on a streaming output bus for said device during and without stopping said operation of said device, each output comprises multiple bits which are presented on the streaming output bus at a time, and the streaming output bus has a width of multiple bits; and
sending bus control data, in addition to said outputs of said counters, from said counters to an interface for said streaming output bus for controlling how said streaming output bus uses said outputs of said counters.

9. A method according to claim 8, wherein:
said presenting includes sequentially providing different counter outputs on said streaming output bus and pausing between counter outputs to match a desired output rate.

10. A method according to claim 8, wherein:
said presenting includes simultaneously presenting multi-bit subsets of bits of different counter outputs on said output bus.

11. A method according to claim 8, further comprising:
presenting said outputs of said counters to a RAM; and
providing access to said outputs of said counters in said RAM.

12. An apparatus for observing a device, comprising:
a set of counters, said set of counters receives a set of signals from said device during an operational mode of said device, each counter maintains associated count data of a number of times an event occurs during said operational mode based on said set of signals;
a selection component, the selection component is coupled to an output of each counter;
a counter control circuit in communication with each counter and with the selection component;
a Debug Bus interface in communication with said selection component and said counter control circuit; and
a Debug Bus in communication with said Debug Bus interface, the counter control circuit, during said operational mode, provides a select signal to the selection component to select count data of the counters, and to provide the selected count data to the Debug Bus interface, where multiple bits of count data are selected at a time from at least one of the counters, the counter control circuit provides a control signal to the Debug Bus interface to provide the selected count data on the Debug Bus, and the Debug Bus has a width of multiple bits, each counter uses a set of $N>1$ bits to maintain the associated count data, and the selection component comprises a counter bus which is simultaneously connected to multiple bits of the N bits for each counter of said set of counters, said counter bus is in communication with said Debug Bus interface to simultaneously provide said multiple bits for each counter to said Debug bus as said selected count data without providing remaining bits of said counters.

\* \* \* \* \*

UNITED STATES PATENT AND TRADEMARK OFFICE
CERTIFICATE OF CORRECTION

PATENT NO. : 7,650,539 B2 Page 1 of 1
APPLICATION NO. : 11/170818
DATED : January 19, 2010
INVENTOR(S) : Carrie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 802 days.

Signed and Sealed this

Twenty-eighth Day of December, 2010

David J. Kappos
*Director of the United States Patent and Trademark Office*